United States Patent [19]

Brown et al.

[11] Patent Number: 4,764,383
[45] Date of Patent: Aug. 16, 1988

[54] SOFT HOMOGENOUS FISH BAIT

[75] Inventors: Sherwin R. Brown, Kingsville, Canada; Michael Drebot, 13 Wardour Street, Bedford, Nova Scotia, Canada, B4A 2H5

[73] Assignees: Michael Drebot; Nova Scotia Department of Fisheries, both of Canada; R. P. Scherer Corportion, Del.

[21] Appl. No.: 36,077

[22] Filed: Apr. 9, 1987

Related U.S. Application Data

[63] Continuation of Ser. No. 789,504, Oct. 21, 1985, abandoned.

[51] Int. Cl.$^4$ ............................................... A23K 1/00
[52] U.S. Cl. ........................................ 426/1; 426/805
[58] Field of Search ........................... 426/1, 576, 805

[56] References Cited

U.S. PATENT DOCUMENTS 3,876,803  4/1975  Stephan et al. ..................... 426/1
4,160,847  7/1979  Orth ..................................... 426/1

FOREIGN PATENT DOCUMENTS 58-23753  2/1983  Japan ..................................... 426/1

Primary Examiner—George Yeung
Attorney, Agent, or Firm—Allegretti & Witcoff, Ltd.

[57] ABSTRACT

A soft, homogenous fish bait consisting essentially of a preformed shape of water, a proteinaceous material, a plasticizer and fish oil, fish silage or a mixture of fish oil and fish silage, useful for attracting fresh-water aquatic animals. An osmotic agent is added to the composition for use in attracting salt-water aquatic animals.

21 Claims, No Drawings

SOFT HOMOGENOUS FISH BAIT

This is a continuation of copending application Ser. No. 789,504, filed Oct. 21, 1985, now abandoned.

BACKGROUND OF THE INVENTION

1. Field of the Invention

This invention relates to a novel soft, homogenous fish bait and a process for the preparation thereof.

2. Description of Related Art

The availability of a variety of artificial fish baits has been known in the art. For example, fish lures have been manufactured from synthetic plastic but lack the qualities of natural bait such as the texture or flavor. Several artificial lures use a natural protein base and are intended to simulate a salmon or other fish egg. U.S. Pat. No. 3,421,899 describes a fish bait comprised of protein, water and a toughening and hardening compound. The invention therein utilizes animal gelatin for the protein and hexamethylene-tetramine, formaldehyde, chromic acid or dichromate salts for the toughening compound. The bait is sufficiently tough to hold its form when put on a hook, but slowly soluble in water. Also utilizing a gel-forming proteinaceous base material, U.S. Pat. No. 3,876,803 describes exposing the exterior of the gelled base to a tanning agent such as formaldehyde, aluminum acetate or mixtures of formaldehyde and aluminum sulfate. Similarly, U.S. Pat. No. 3,988,479 discloses a gel-forming proteinaceous base material formed into a gelled shaped that is exposed to a polymeric tanning agent consisting essentially of an aqueous solution of a condensation product of melamine with formaldehyde.

These artificial fish baits present certain difficulties during their use. The synthetic plastic baits are unable to leave a luring scent in water due to their insoluble nature. The addition of a hardening or tanning agent produces an undesirable "feel" or texture to the bait. Present automatic baiting characteristics with natural and other bait produces in the hooking chamber rapid settling and fluctuating densities in the bait-sea water phase.

SUMMARY OF THE INVENTION

It is therefore an important object of the present invention to provide a highly unique artificial fish bait simulating advantageous qualities of natural bait.

Another object is to provide a suitable "feel" or texture to the bait simulating physical characteristics of natural bait.

A further object is to provide a strong, homogenous matrix that has positive grab and tension for successful hooking, can retain a fish hook for long periods of time and can be rehooked if required.

A still further object is to provide a fish bait relatively stable in water, yet have leaching characteristics to attract fish.

Another further object is to provide a bait producing good mixing and slow settling in use with automatic baiting devices.

Further purposes and objects of the present invention will appear as the specification proceeds.

The foregoing objects are accomplished by providing a mixture of a protein, a plasticizer, water, an osmotic agent and fish oil, fish silage or a mixture of fish oil and fish silage, which is molded into a solid state form. The product of this invention accomplishes the texture and simulates the physical characteristics of natural bait. Bait density and structure resemble that of firm, fresh natural bait providing positive grab and tension for successful hook. The relatively high gelatic content provides sufficient matrix resiliency to allow repeated use through rehooking without destructive tearing or damage that occur to other known baits. Another important feature of the homogenous matrix bait is the allowance to have this bait mechanically or manually cut in varying sizes to make automatic baiting methods and material use more efficient. Furthermore, the density properties of the high gelatin content bait of the present invention would produce good mixing and slow settling, particularly in seawater, to give an automatic baiting device higher operational efficiency regarding hooks being secure with bait.

DESCRIPTION OF THE PREFERRED EMBODIMENTS

In accordance with the present invention, the composition employed as an artificial fish bait includes water, a proteinaceous base material such as gelatin and a plasticizer or humectant such as polyethylene glycol or glycerin. The amount of water may be varied according to each formulation but is typically about 20% to about 60% (w/w).

The proteinaceous base material is in the amount of about 10% to about 40% (w/w), preferably 20% (w/w). The protein can be selected from the group consisting of gelatin, hydrolyzed protein and animal or fish stock. A most preferred proteinaceous material is gelatin. A beneficial mixture is the use of an approximate 2:1 ratio of low to high bloom gelatin, for example, about 14% (w/w) of low bloom gelatin mixed with 6% (w/w) of high bloom gelatin.

The amount of the plasticizer in the composition of the invention would be present in the range of about 10% to about 40% (w/w), preferably 25% (w/w). A preferable plasticizer is a humectant agent such as glycerin, propylene glycol, sorbitol and the like. Suitable plasticizers also include polyols, for example, edible glycols such as polyethylene glycol. As a strengthening agent, polyethylene glycol 400 N.F. allows for the reduction of the percentage Water U.S.P. without having to increase the amount of fish oil or gelatin.

The composition of the instant invention further includes therein fish oil, fish silage or a mixture of fish oil and fish silage (ground-up fish or fish parts and formic acid) to provide a scent in water to attract fish. Fish oil may be used in the amount of about 4% to about 25% (w/w), preferably 15% (w/w). Fish silage may be substituted for the fish oil in the same quantity. A typical mixture is used in the approximate 3:1 ratio by weight of fish silage to fish oil to comprise about 10% to about 20% (w/w) of the total composition. Preferably, the amount of the fish oil is about 5% (w/w) and the amount of the fish silage is about 15% (w/w). Suitable fish oil and silage could be formed from herring, mackeral, smelt, cod, squid or red fish, like ocean perch, preferably squid. Of course, fresh water fish such as smelt as fresh water fish silage would be more effective in catching fresh water fish than salt water fish silage and vice versa. Using old silage generally results in a softer texture to the final product than using new silage.

An osmotic agent may also be added to absorb water into the gel, particularly when fishing in seawater, in order to maintain a suitable "soft" feel to the product. A deliquescent salt, for example, reverses the osmotic trend of dehydration by seawater. Suitable softening agents include but are not limited to anhydrous salts such as magnesium chloride, calcium chloride and the like. Such softening agents may be used in the amount of about 1% to about 6% (w/w), preferably 3% (w/w), to avoid hardening in the brine of the ocean.

Besides the above components, other ingredients may be desirable to add to the inventive compositions for particular purposes. For example, conventional preservative agents in typical concentrations may be incorporated with the fish oil to prevent rancidity or with the gel mass to inhibit microbial or fungal growth. Suitable agents include but are not limited to about 0.1% (based on the weight of fish oil only) of butylated hydroxytoluene and butylated hydroxyanisole, respectively, about 0.05% (w/w) of vitamin E alcohol and about 0.01% (w/w) of ascorbic acid. Similarly, potassium sorbate and the like may be added to the gel mass to act as a preservative for the gelatin in the amount of about 0.25% (w/w). Likewise, an approximate 4:1 methyl-propyl blend of parabens may be used at a concentration of about 0.4% for the purpose of inhibiting microbial growth.

Optional ingredients further include thickening agents, emulsifiers and colloidal stabilizers. For example, acacia gum, carageenan, etc. in an appropriate amount may be used as thickening agents and colloidal stabilizers. Also, it is beneficial to maintain a slightly acidic fish bait substitute at a pH of about 6±0.5 because fish flesh is normally slightly acidic. If necessary, proper pH adjustment may be accomplished with the addition of an appropriate amount of an organic acid such as formic acid or propionic acid or an inorganic acid such as hydrochloric acid or phosphoric acid.

The artificial bait of this invention may be prepared by the "hot stir" method. In this method, the water is heated to about 70°–80° C. Gelatin, for example, is added and completely melted. A plasticizer such as glycerin is added to the gelatin solution. The fish oil, the fish silage or the mixture of fish oil and fish silage, as well as any other ingredients, are mixed in a separate container and then slowly stirred into the gelatin solution. The mix is poured into molds and allowed to cool to room temperature.

In the processing of the protein matrix, the ingredients are preferably heated under a high vacuum (one inch or less absolute). This technique produces a melt and mix temperature point considerably lower than that which would exist if this step were done at atmospheric pressure. This procedure reduces product breakdown and thermal change which would reduce or even negate the attractant properties of the bait.

It also should be appreciated that when typical reaction conditions (e.g., temperature, reaction times) have been given, the conditions which are both above and below these specified ranges can also be used, though generally less conveniently.

The present invention further encompasses the methods of using the homogenous fish bait described hereinabove. One method includes attracting a fresh-water aquatic animal comprising placing the fish bait on a fish hook in fresh water. Another method involves attracting a salt-water aquatic animal comprising placing the fish bait which contains an osmotic agent on a fish hook in salt water.

The term "fresh-water aquatic animal" includes but is not limited to fresh-water fish such as pike, whitefish, trout, perch, etc. The term "salt-water aquatic animal" includes but is not limited to salt-water fish such as cod, flounder, bluefish, salmon, tuna, etc.

Whereas the exact scope of the instant invention is set forth in the appended claims, the following examples illustrate certain aspects of the present invention. However, the examples are set forth for illustration only and are not to be construed as limitations on the present invention except as set forth in the appended claims.

A further understanding of the invention may be obtained from the following nonlimiting examples.

EXAMPLE 1

Preparation of Artificial Fish Bait

| Component | Percent (w/w) |
| --- | --- |
| Water U.S.P. | 45 |
| Fish oil | 20 |
| Gelatin (regular bloom) | 20 |
| Polyethylene glycol 400 N.F. (PEG 400) | 15 |

The water was first heated to approximately 75° C. The gelatin was added, while stirring, and completely melted. At this point a 4:1 methyl-propyl blend of parabens was added at a concentration of 0.4% for the purposes of inhibiting microbial growth. In a separate container, the fish oil and PEG 400 were mixed approximately 15 minutes. Butylated hydroxytoluene and butylated hydroxyanisole were added to the mixture at a concentration of 0.1% each (based on the weight of oil only), for the purposes of inhibiting the fish oil from going rancid. The fish oil/PEG 400 mixture was slowly stirred into the gelatin solution by pouring it through an 80–100 mesh stainless steel screen. The mix was stirred approximately 20 minutes (until uniform), and the resultant mix was poured into molds and allowed to cool to room temperature. Upon removing the bait from the molds, it was exposed to the air (25–30% humidity at room temperature), for a period of 24 hours. The bait was cut into pieces 1"×1"×2".

EXAMPLE 2

Preparation of Artificial Fish Bait Containing Acacia Gum N.F. Emulsion

Part A. Acacia Gum N.F. Emulsion

| Component | Percent (w/w) |
| --- | --- |
| Water U.S.P. | 63 |
| Fish oil | 25 |
| Acacia gum N.F. | 12 |

Part B. Artificial Fish Bait

| Component | Percent (w/w) |
| --- | --- |
| Water U.S.P. | 50 |
| Gelatin (regular bloom) | 20 |
| Acacia gum N.F. emulsion | 16 |
| Glycerin U.S.P. | 14 |

The water (Part B) was heated to approximately 75° C. The gelatin was added, while stirring, and completely melted. Glycerin was added at the gelatin melt stage. In a separate container, an emulsion (Part A) was prepared by mixing the fish oil, acacia gum and water. The emulsion was slowly stirred into the gelatin solution by pouring it through an 80–100 mesh stainless steel screen. The mix was stirred approximately 20 minutes (until uniform), and the resultant mix was poured into molds and allowed to cool to room temperature. Upon removing the bait from the molds, it was exposed to the air (25-30% humidity at room temperature), for a period of 24 hours. The bait was cut into pieces 1"×1"×2".

EXAMPLE 3

Preparation of Artificial Fish Bait (50 kilogram)

| Component | Percent (w/w) |
|---|---|
| Gelatin (regular bloom) | 20 |
| Glycerin U.S.P. | 25 |
| Water U.S.P. | 45 |
| Fish oil | 10 |

The water was heated to approximately 75° C. The gelatin was added, while stirring, and completely melted. At this point 0.25% (w/w) potassium sorbate was added as a preservative for the gelatin. The glycerin was added at the gelatin melt stage. To the fish oil, 0.05% (w/w) vitamin E alcohol was added to prevent rancidity. The fish oil was slowly stirred into the gelatin solution by pouring it through an 80–100 mesh stainless steel screen. The mix was stirred approximately 20 minutes (until uniform). The molten material was poured into deep trays to a depth of 12.5 mm which had a net weight of 8.0 kilograms. The trays were then placed at room temperature for sixteen (16) hours to dry. The fish bait substitute was then cut into pieces approximately 29×36 cm and individually wrapped in plastic.

EXAMPLE 4

Preparation of Artificial Fish Bait

| Component | Percent (w/w) |
|---|---|
| Magnesium chloride (anhydrous) | 3 |
| Gelatin (regular bloom) | 20 |
| Glycerin U.S.P. | 25 |
| Water U.S.P. (total*) 37 | |
| Fish oil | 15 |

*The water content was adjusted to account for the six waters of hydration in the MgCl₂ added.

The product of this example was prepared in accordance with the general procedure of Example 3. The magnesium chloride was added to the Water U.S.P.

EXAMPLE 5

Preparation of Artificial Fish Bait

| Component | Percent (w/w) |
|---|---|
| Magnesium chloride (anhydrous) | 3.0 |
| Gelatin (regular bloom) | 6.4 |
| Gelatin (low bloom) | 13.6 |
| Glycerin U.S.P. | 25.0 |
| Water U.S.P. (total*) | 37.0 |
| Fish oil | 15.0 |

*The water content was adjusted to account for the six waters of hydration in the MgCl₂ added.

The product of this example was prepared in accordance with the general procedure of Example 4.

EXAMPLE 6

Preparation of Artificial Fish Bait

| Component | Percent (w/w) |
|---|---|
| Magnesium chloride (anhydrous) | 3 |
| Gelatin (regular bloom) | 20 |
| Glycerin U.S.P. | 25 |
| Water U.S.P. (total*) | 37 |
| Fish oil | 5 |
| Fish silage | 10 |

*The water content was adjusted to account for the six waters of hydration in the MgCl₂ added.

The product of this example was prepared in accordance with the general procedure of Example 4. The fish silage was mixed with the fish oil prior to stirring the fish oil into the gelatin solution.

While in the foregoing there has been provided a detailed description of preferred embodiments of the present invention, it is to be understood that all equivalents obvious to those having skill in the art are to be included within the scope of the invention as claimed.

We claim:

1. A process for preparing a homogenous fish bait for a fresh-water aquatic animal, said fish bait having a soft consistency, positive grab and tension for hooking and sufficient matrix resiliency for rehooking, said process consisting essentially of stirring and heating a mixture of water, a proteinaceous material and a plasticizer; adding thereto fish oil, fish silage or a mixture of fish oil and fish silage to form a fish bait composition; and forming the composition into a pre-selected shape.

2. The process of claim 1 wherein the water is present in the amount of about 20% to about 60% (w/w), the proteinaceous material is present in the amount of about 10% to about 40% (w/w), the plasticizer is present in the amount of about 10% to about 40% (w/w) and the fish oil is present in the amount of about 4% to about 25% (w/w), the fish silage is present in the amount of about 4% to about 25% (w/w) or the mixture is present with the fish oil in the amount of about 2.5% to about 10% (w/w) and the fish silage in the amount of about 5% to about 25% (w/w), the ratio of said fish oil to said fish silage being about 1:3 by weight.

3. A process for preparing a homogenous fish bait for a fresh-water or salt-water aquatic animal, said fish bait having a soft consistency, positive grab and tension for hooking and sufficient matrix resiliency for rehooking, said process consisting essentially of stirring and heating a mixture of water, a proteinaceous material and a plasticizer; incorporating an osmotic agent; adding thereto fish oil, fish silage or a mixture of fish oil and fish silage to form a fish bait composition; and forming the composition into a pre-selected shape.

4. The process of claim 3 wherein the water is present in the amount of about 20% to about 60% (w/w), the proteinaceous material is present in the amount of about 10% to about 40% (w/w), the plasticizer is present in the amount of about 10% to about 40% (w/w), the osmotic agent is present in the amount of about 1% to about 6% (w/w) and the fish oil is present in the amount of about 4% to about 25% (w/w), the fish silage is present in the amount of about 4% to about 25% (w/w) or the mixture is present with the fish oil in the amount of about 2.5% to about 10% (w/w) and the fish silage in the amount of about 5% to about 25% (w/w), the ratio of said fish oil to said fish silage being about 1:3 by weight.

5. The process of claim 1, 2, 3 or 4 wherein the proteinaceous material is gelatin, hydrolyzed protein, animal stock or fish stock.

6. The process of claim 1, 2, 3 or 4 wherein at least one preservative is added.

7. The process of claim 3 or 4 wherein the osmotic agent is a deliquescent salt.

8. The process of claim 3 or 4 wherein the osmotic agent is magnesium chloride or calcium chloride.

9. The process of claim 1, 2, 3 or 4 wherein the plasticizer is glycerin, polyethylene glycol, propylene glycol or sorbitol.

10. A homogenous fish bait for a fresh-water aquatic animal consisting essentially of a preformed shape of water, a proteinaceous material, a plasticizer and fish oil, fish silage or a mixture of fish oil and fish silage, said fish bait having a soft consistency, positive grab and tension for hooking and sufficient matrix resiliency for rehooking.

11. The homogenous fish bait of claim 10 for said fresh-water aquatic animal or a salt-water aquatic animal which includes therein an osmotic agent.

12. The homogenous fish bait of claim 10 wherein the proteinaceous material is gelatin, hydrolyzed protein, animal stock or fish stock and the plasticizer is glycerin, polyethylene glycol, propylene glycol or sorbitol.

13. The homogenous fish bait of claim 12 which includes therein acacia gum.

14. The homogenous fish bait of claim 12 for said fresh-water aquatic animal or a salt-water aquatic animal which includes therein magnesium chloride or calcium chloride and acacia gum.

15. A homogenous fish bait for a fresh-water aquatic animal consisting essentially of a preformed shape of about 20% to about 60% (w/w) water, about 10% to about 40% (w/w) proteinaceous material, about 10% to about 40% (w/w) plasticizer and about 4% to about 25% (w/w) fish oil, about 4% to about 25% (w/w) fish silage or a mixture of about 2.5% to about 10% (w/w) fish oil and about 5% to about 25% (w/w) fish silage, the ratio of said fish oil to said fish silage being about 1:3 by weight, said fish bait having a soft consistency, positive grab and tension for hooking and sufficient matrix resiliency for rehooking.

16. The homogenous fish bait of claim 15 for said fresh-water aquatic animal or a salt-water aquatic animal which includes therein an osmotic agent in the amount of about 1% to about 6% (w/w).

17. The homogenous fish bait of claim 15 wherein the proteinaceous material is gelatin, hydrolyzed protein, animal stock or fish stock and the plasticizer is glycerin, polyethylene glycol, propylene glycol or sorbitol.

18. The homogenous fish bait of claim 17 for said fresh-water aquatic animal or a salt-water aquatic animal which includes therein magnesium chloride or calcium chloride in the amount of about 1% to about 6% (w/w).

19. A method of attracting a fresh-water aquatic animal comprising placing the fish bait of claim 10, 11, 15 or 16 on a fish hook in fresh water.

20. A method of attracting a salt-water aquatic animal comprising placing the fish bait of claim 11 or 16 on a fish hook in salt water.

21. The method of claim 20 wherein the salt-water aquatic animal is a cod fish.

* * * * *